United States Patent [19]
Conway et al.

[11] Patent Number: 5,458,387
[45] Date of Patent: Oct. 17, 1995

[54] MICROGRIPPER

[75] Inventors: Patrick J. Conway, Charleston, W. Va.; George E. Mauro, Windham, N.H.

[73] Assignee: Microscience Group, Inc., St. Albans, W. Va.

[21] Appl. No.: 213,517

[22] Filed: Mar. 16, 1994

Related U.S. Application Data

[62] Division of Ser. No. 799,121, Nov. 27, 1991, Pat. No. 5,332,275.

[51] Int. Cl.⁶ ...................................................... B25J 15/12
[52] U.S. Cl. ...................... 294/100; 294/103.1; 294/902; 901/38; 901/39
[58] Field of Search .................... 294/86.4, 88, 99.1, 294/100, 103.1, 115, 119.1, 119.3, 902, 907; 414/729, 730, 741, 751; 901/31, 32, 34, 36–39

[56] References Cited

U.S. PATENT DOCUMENTS

| | | | |
|---|---|---|---|
| Re. 28,663 | 12/1975 | Baer | 294/99.1 |
| 1,315,581 | 9/1919 | Scott | 294/99 X |
| 3,353,860 | 11/1967 | Meissner | 294/100 |
| 3,370,213 | 2/1968 | Rose | 294/115 |
| 3,491,520 | 1/1970 | Watson | 56/328 |
| 3,625,378 | 12/1971 | Attiz | 294/100 |
| 3,827,437 | 8/1974 | Inaba | 128/328 |
| 4,130,314 | 12/1978 | Storm | 294/100 |
| 4,540,211 | 9/1985 | Masserang | 294/99.1 |
| 4,544,193 | 10/1985 | Dunn et al. | 294/86.4 |
| 4,552,397 | 11/1985 | Conrad | 294/86.4 |
| 4,565,400 | 1/1986 | Nakashima et al. | 294/88 |
| 4,579,380 | 4/1986 | Zaremsky et al. | 294/119.1 |
| 4,590,673 | 5/1986 | Dornes et al. | 29/845 |
| 4,610,475 | 9/1986 | Heiserman | 294/86.4 |
| 4,667,997 | 5/1987 | Udagawa et al. | 294/99.1 X |
| 4,671,553 | 6/1987 | Bertini | 294/100 |
| 4,694,230 | 9/1987 | Slocum et al. | 901/34 |
| 4,696,501 | 9/1987 | Webb | 294/86.4 |
| 4,699,414 | 10/1987 | Jones | 294/119.1 |
| 4,735,451 | 4/1988 | Wojciechowski et al. | 294/103.1 |
| 4,796,357 | 1/1989 | Smith | 29/840 |
| 4,813,732 | 3/1989 | Klem | 294/103.1 |
| 4,816,730 | 3/1989 | Wilhelm et al. | 901/38 |
| 4,828,309 | 5/1989 | Germaine | 294/100 |
| 4,872,803 | 10/1989 | Asakawa | 294/99.1 X |
| 4,898,416 | 2/1990 | Hubbard et al. | 294/119.1 |
| 4,955,656 | 9/1990 | Krogstrup et al. | 294/100 |
| 5,046,773 | 9/1991 | Modesitt | 294/100 |
| 5,163,804 | 11/1992 | Kobayashi | 294/99.1 X |

FOREIGN PATENT DOCUMENTS

| | | | |
|---|---|---|---|
| 205113 | 12/1983 | German Dem. Rep. | 294/100 |
| 2454825 | 5/1976 | Germany | 294/99.1 |
| 3011837 | 10/1981 | Germany | 294/100 |
| 3038234 | 5/1982 | Germany | 294/902 |
| 3136740 | 3/1983 | Germany . | |
| 3513893 | 10/1986 | Germany | 901/39 |
| 216788 | 8/1989 | Japan | 294/119.1 |
| 937140 | 6/1982 | U.S.S.R. | 901/36 |
| 1009758 | 4/1983 | U.S.S.R. | 294/103.1 |
| 1364470 | 1/1988 | U.S.S.R. | 901/36 |
| 1400877 | 6/1988 | U.S.S.R. . | |
| 1497148 | 7/1989 | U.S.S.R. | 294/103.1 |

*Primary Examiner*—Johnny D. Cherry
*Attorney, Agent, or Firm*—Fisher, Christen & Sabol

[57] ABSTRACT

A microgripper for gripping and releasing an object, particularly very small objects. The microgripper includes a support and two cantilevered flexible arms, each of which is mounted on one end to the support. The other ends of the flexible arms are capable of being flexed toward and away from each other. A servomotor, is affixed to the support. There is a slide arrangement driven by the servomotor and which is adapted to move the unmounted ends of the flexible arms toward or away from each other, thereby providing, respectively, a gripping or releasing movement. An apparatus which includes a micromanipulator, the microgripper which is operationally, detachably affixed to the micromanipulator, and a control system which is electrically connected to the motor means whereby the movement of the slide arrangement is controlled.

12 Claims, 9 Drawing Sheets

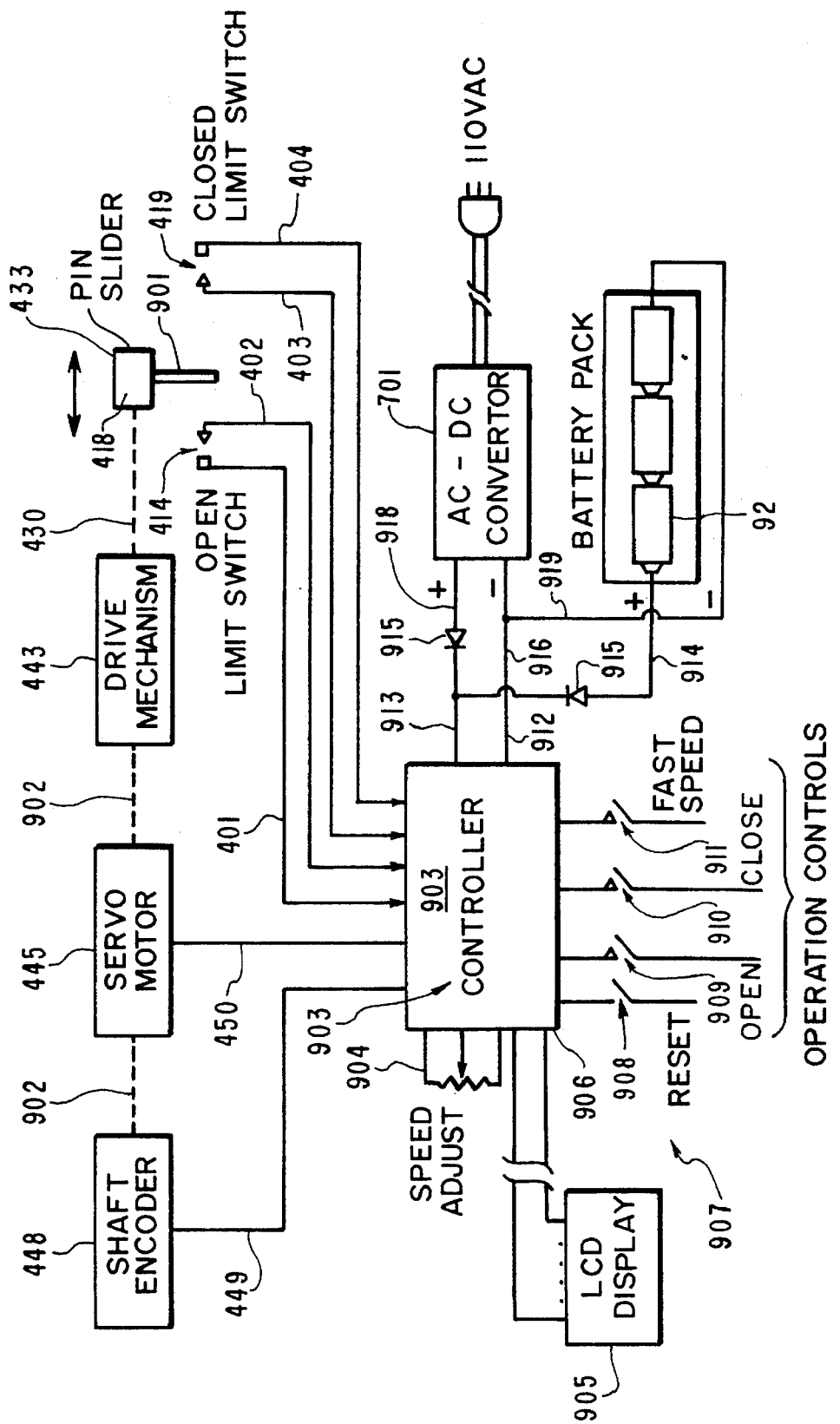

FIG. 9

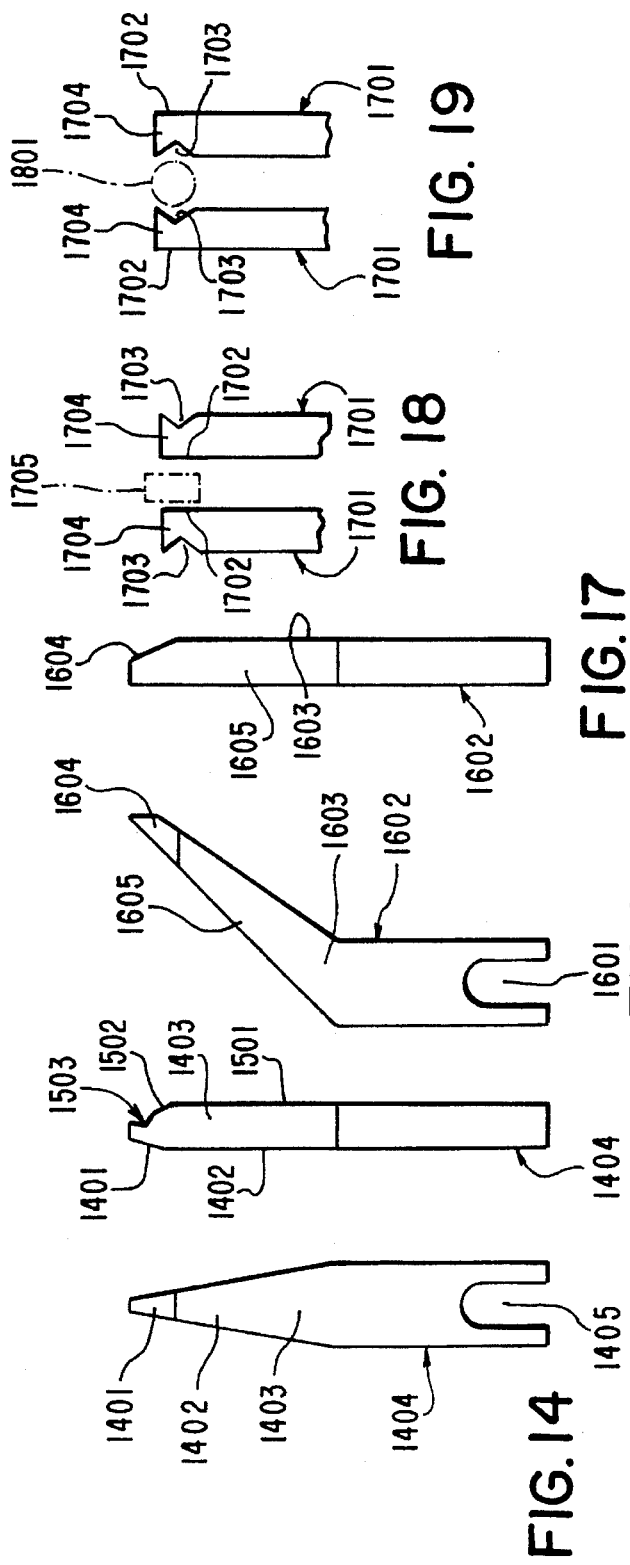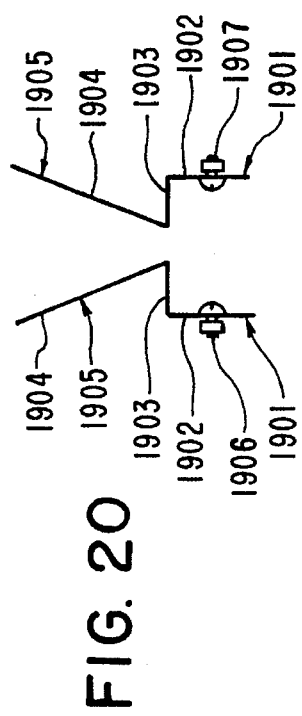

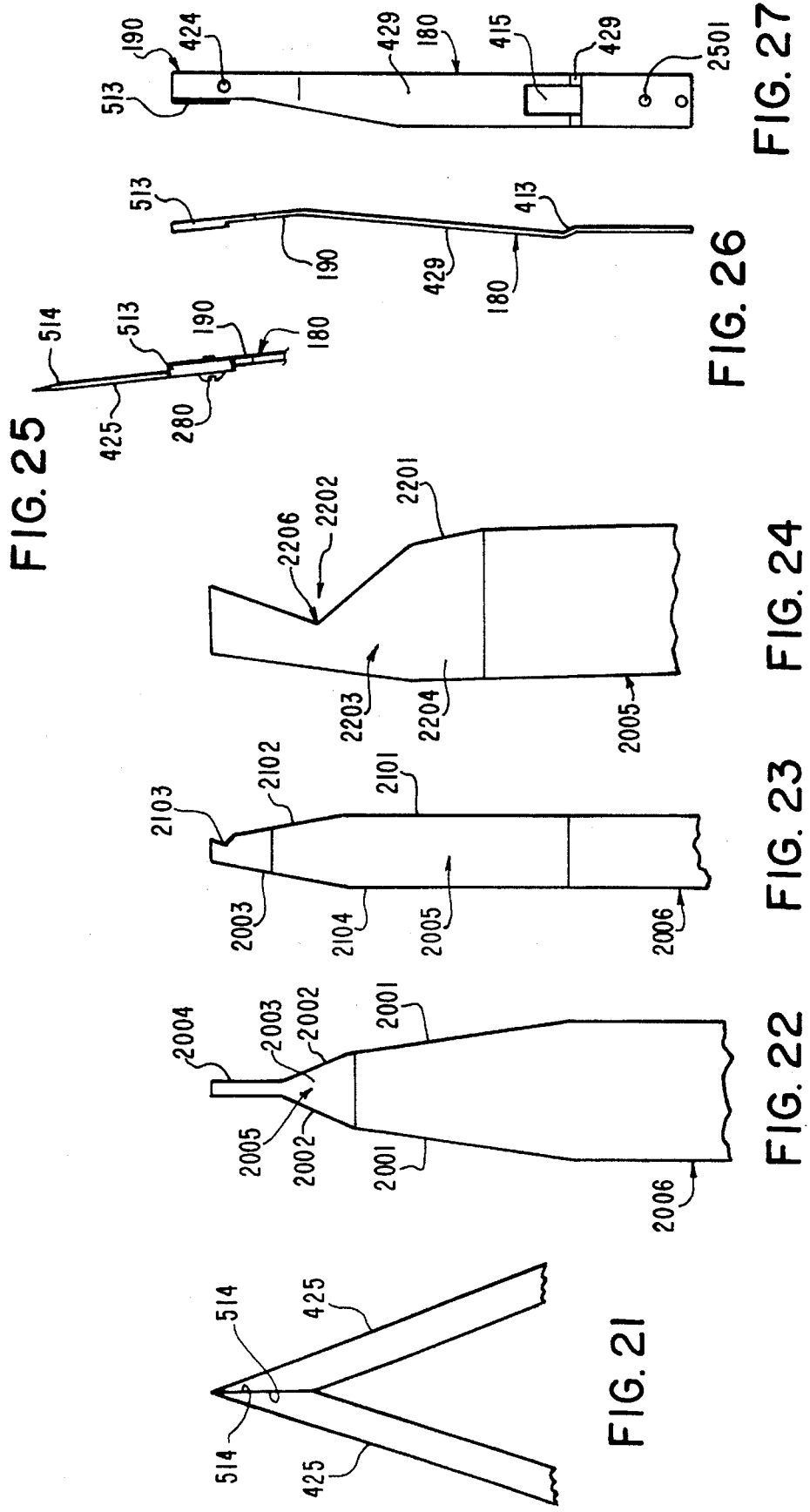

MICROGRIPPER

This is a divisional of U.S. Ser. No. 799,121, filed Nov. 27, 1991, now U.S. Pat. No. 5,332,275.

BACKGROUND OF THE INVENTION

1. Field Of The Invention

The invention relates to microgrippers which can be used with micromanipulators.

2. Background Art

Remotely controlled microgrippers in conjunction with manipulators that are used for grasping, moving and positioning a variety of objects from a remote position are known. The microgrippers and manipulators may be manually controlled or controlled by a machine, such as, modern data processing apparatus. Such microgrippers and manipulators are used, for example, in modern robot aided manufacturing and assembly procedures and in handling dangerous materials.

Russian Patent No. 1,400,877 discloses a robot gripper which has a spring-loaded slide inside of a casing and which is connected by a pivot rod of a power cylinder. In more detail, the robot gripper has a casing, to which is attached a fixed jaw and within which is located a spring acting upon a slide connected through a pivot to the rod of a power cylinder. A moving jaw is rigidly attached to the slide and the second bearing point of the moving jaw is a guide rigidly connected to the fixed jaw. The pivot prevents wedging between the slide and the rod of the cylinder, and the guide provides rigidity for the jaws.

U.S. Pat. No. 4,565,400 discloses a double hand for an industrial robot which has a hand body, two sets of work clamping units and two sets of actuators to drive the work clamping units, respectively, for opening and closing motions. The hand body has a rear end attachable to the free end of the robot wrist of an industrial robot, a front end and opposite sides which extend between the front end and the rear end. Each working clamping unit has a pair of gripping fingers, and the pairs of gripping fingers of the two sets of work gripping units are supported pivotally at the roots thereof on the opposite sides of the hand body for turning motion. The paired gripping fingers are turned about the respective roots thereof in opposite directions by the associated actuator.

U.S. Pat. No. 4,696,501 discloses an electronic force-detecting robot gripper, for gripping objects, which is attached to an external robot arm. The gripper includes motor apparatus, gripper jaws, and electrical circuits which drive the gripper motor and sense the amount of force applied by the jaws. The force applied by the jaws is proportional to a threshold value of the motor current. When the motor current exceeds the threshold value, the electrical circuits supply a feedback signal to the electrical control circuit which, in turn, stops the gripper motor.

U.S. Pat. No. 4,796,357 discloses a placement head assembly for use in an electrical component placement machine. A hollow main shaft has a carriage assembly disposed thereabouts with rollers which provide axial movement along the shaft. A vacuum support shaft within the main shaft telescopes downwards to pickup and retain a component. The carriage assembly carries actuator means which urge it into axial movement in response to fluid pressure differentials. Tweezer means are pendently disposed in quadrature from pivot points about the shaft. Pivoting action of the tweezer means forces jaws radially inwards into contact with the component, thereby aligning it for subsequent board placement. In one embodiment, the actuator means includes a piston-cylinder assembly. Pressure differential across the piston causes downward movement of the carriage assembly. Reverse pressure differential urges the carriage assembly upward.

U.S. Pat. No. 4,552,397 discloses a doffing/donning apparatus used in combination with a row of winders each of which winds filamentary material upon a tube carried by a rotary spindle of the winder to form a package. The apparatus includes a carrier mounted for movement generally parallel to and above the row of winders. A column is mounted on the carrier for horizontal movement. A package exchange arm is mounted on the column for up-and-down movement and is alignable with the winder spindle so that the package can be transferred to the package exchange arm. A tube exchange arm is mounted on the column for up-and-down movement and is alignable with the spindle so that a tube on the tube exchange arm can be transferred to the spindle. A shuttle is spaced horizontally from and vertically above the row of winders, and includes a package transfer arm and a tube transfer arm. The package exchange and tube exchange arms are moved along the column to the level of the shuttle. The column is moved horizontally toward the shuttle so that the package can be transferred from the package exchange arm to the package transfer arm, and a tube can be transferred from the tube transfer arm to the tube exchange arm. The shuttle is transferred to a remote station where the package is removed from the package transfer arm and a tube is inserted on the tube transfer arm. The tube exchange arm has a rotary cylinder which has inwardly projecting bristles. The cylinder is telescoped onto the tube while being rotated so that the bristles deflect tangentially to grip the tube.

U.S. Pat. No. 1,315,581 discloses a tool which includes a plurality of depending prongs which tend to close toward a common central vertical line and a central member which is movable along the line. Each prong is operatively connected to the member by a pivoted link. The member is adapted to be brought downward along the line to dead-center the links and thereby hold the prongs apart.

U.S. Pat. No. 4,813,732 discloses a tactile sensor based wafer which handles apparatus designed to be attached to a commercially available industrial robotic arm for manipulating semiconductor wafers with high functional reliability. The apparatus has three rod-like projections called fingers, one finger is extendable and the others are fixed. All of the fingers are instrumented with strain gauge sensors in order to allow the monitoring of all of the forces applied to the fingers during wafer handling operations. All of the sensors provide proportional data. The wafer handling apparatus enables a monitoring computer to direct the motions of a satisfactorily equipped robot arm to operate in the following modes of operation. Force controlled grasping of the wafer can be provided to insure adequate grasp for transport and to limit forces exerted on the wafer. Force monitoring while releasing a wafer can be provided to insure safe handling during transfer to another device or surface, thus, minimizing the likelihood of dropping a wafer. Proportional adaptive control of necessary robot motions can be provided to align wafers in close proximity to process carrier surfaces. Proportional adaptive control of robot motions which are necessary to guide the gripping apparatus can be provided for balanced contact with the edge of a wafer. Force monitoring can be provided for the purpose of detecting collisions with objects or humans during transport of a wafer.

U.S. Pat. No. 4,610,475 discloses a gripping apparatus for gripping and releasing objects, and for use with a micromanipulator. Spaced cantilever jaws which extend in substantially the same direction from a support are each formed of a pair of elongated ribbons of piezoelectric polymer bonded together in oppositely polarized orientation. An electrically conductive thin film is bonded to the outer surfaces of the laminate. A voltage is applied to the conductive films which causes the polymer ribbon laminates to bend toward or away from each other dependent upon the polarity of the applied voltage so that they grip an object.

Attention is also drawn to U.S. Pat. Nos. 3,491,520, 3,353,860, 3,827,437, 4,735,451, 4,590,673 and 4,955,656, U.S. Reissue Patent No. Re. 28,663 and German OS 3136740.

BROAD DESCRIPTION OF THE INVENTION

An object of the invention is to provide a microgripper, for gripping and releasing objects, which can be used with micromanipulators and controllers. Other objects and advantages of the invention are set out herein or obvious herefrom to one skilled in the art.

The objects and advantages of the invention are achieved by the microgripping apparatus and the micromanipulator of the invention.

The invention involves a microgripper for gripping and releasing an object, particularly very small objects. The microgripper includes support means and two cantilevered flexible arms, each of which is mounted on one end of the support means. The other ends of the flexible arms are capable of being flexed toward and away from each other. Motor means, preferably a servomotor, is affixed to the support means. There is slide means which is driven by the motor means and which is adapted to move the unmounted ends of the flexible arms toward or away from each other, thereby providing, respectively, a gripping or releasing movement. An advantage is the concentricity of movement of the forceps arms in the application of equal force from both directions. This is a preferred embodiment of the invention.

With the invention assembly, an item can be grasped and picked up, moved to the desired site, aligned in proper orientation with respect to the desired site, and placed on the desired site. The grasping operation and holding force of the invention microgripper can be controlled so as not to damage components, crush circuit leads or the like. There is the ability for precise control over the forces applied inwardly to the component. The invention microgripper is reliable, and non-destructive of the component sought to be placed.

Preferably, the motor means comprises a servomotor. Preferably, the motor means also includes an encoder which is integral with the servomotor, the encoder output controlling the rotation of the servomotor and shaft thereof, which in turn controls the relative motion of the slider means. The motor means can also comprise a stepper motor.

Preferably, the unmounted ends of the two cantilevered, flexible arms normally contact each other or are close to each other, and the slider means has a protrusion which extends between the two flexible arms. The protrusion is adapted so as to force the unmounted ends of the two flexible arms away from each other when the protrusion of the slide means is moved relative to the unmounted ends and so as to allow the unmounted ends of the two flexible arms to return towards each other when the protrusion of the slide means is moved in the other direction relative to the unmounted ends.

Preferably, the unmounted ends of the two cantilevered, flexible arms are normally spread apart, and the slider means has two protrusions, with the first protrusion being located outside of one of the flexible arms and the second protrusion being located outside of the other flexible arm. The two protrusions are adapted so as to force the unmounted ends of the two flexible arms toward each other when the two protrusions of the slide means is moved relative to the unmounted ends and so as to allow the unmounted ends of the two flexible arms to return away from each other when the two protrusions of the slide means are moved in the other direction relative to the unmounted ends.

Preferably, the unmounted ends of the two cantilevered, flexible arms comprise a replaceable tip. Preferably, the unmounted end of each replacement tip has a slanted tip or vertical side groove which faces the unmounted end of the other replacement tip.

The invention also involves apparatus which comprises a micromanipulator, the above-described embodiment of the microgripper which is operationally and detachably affixed to the microgripper, and a control system which is electrically connected to the motor means whereby the movement of the slide means is controlled.

The microgripper of the invention is in essence a motorized precision forceps which can be used for precision placement of very small components. It is designed for delicate microassembly of integrated circuits, fiber optics and other small components. It allows positioning, testing and removal of fine wires, yet can firmly hold a computer chip.

More specifically regarding applications, the invention microgripper, which concerns semiconductors, allows precise positioning of components and wires, hybrid circuit reworking and prototyping, removal of components without damage in failure analysis, and testing of wire bonds in quality control procedures. Further, the microgripper, which concerns fiber optics, allows the gripping and alignment of spliced filaments and reflective elements, and concerning microassembly, allows the picking and placing of small, delicate parts without damage or dropping. The invention apparatus can be used in the electronic manufacturing arts for placing components on circuit boards—the placement operation can be programmed so it is automatic.

User features of the invention microgripper include: ease of use and avoidance of operator fatigue; fits virtually all micropositioners; prevents accidental breakage; has a consistent, measurable grip force; has interchangeable tips and custom tips to user specifications; and is programmable for repeatability.

BRIEF DESCRIPTION OF THE DRAWINGS

In the drawings:

FIG. 6 is a cross-sectional view taken along line 6—6 in

FIG. 2;

FIG. 8 is a schematic block diagram of portions of the microgripper of FIG. 2 and the control system for the microgripper which shows electrical circuitry;

FIG. 9 is a schematic block diagram of portions of another embodiment of the microgripper of the invention and the control system for the microgripper which shows electrical circuitry;

FIG. 14 is a left side elevational view of another embodiment of the replaceable tip of the forceps arms;

FIG. 15 is a top view of the replaceable tip of FIG. 14;

FIG. 16 is a right side elevational view of another embodiment of the replaceable tip of the forceps arms;

FIG. 17 is a top view of the replaceable tip of FIG. 16;

FIG. 18 is a top view of another embodiment of the outer end of the replaceable tips of the forceps arms;

FIG. 19 is a top view of the outer end of two replaceable tips of FIG. 18 aligned in the reverse manner;

FIG. 20 is a top schematic view of two tip extenders;

FIG. 21 is a top view of the end portion of the replaceable tips of FIG. 2;

FIG. 22 is a left side elevational view of another embodiment of the outer end of the replaceable tip of the forceps arms;

FIG. 23 is a top view of the replaceable tip of FIG. 22;

FIG. 24 is a top view of a further embodiment of the outer end of the replaceable tip of the forceps arm;

FIG. 25 is a top view of the forceps arm of the microgripper of FIGS. 2 to 4;

FIG. 26 is a right side elevational view of the forceps arm of FIG. 25; and

FIG. 27 is a top view of the replaceable tip attached to the forceps arm of FIG. 25.

DETAILED DESCRIPTION OF THE INVENTION

Figure 1:
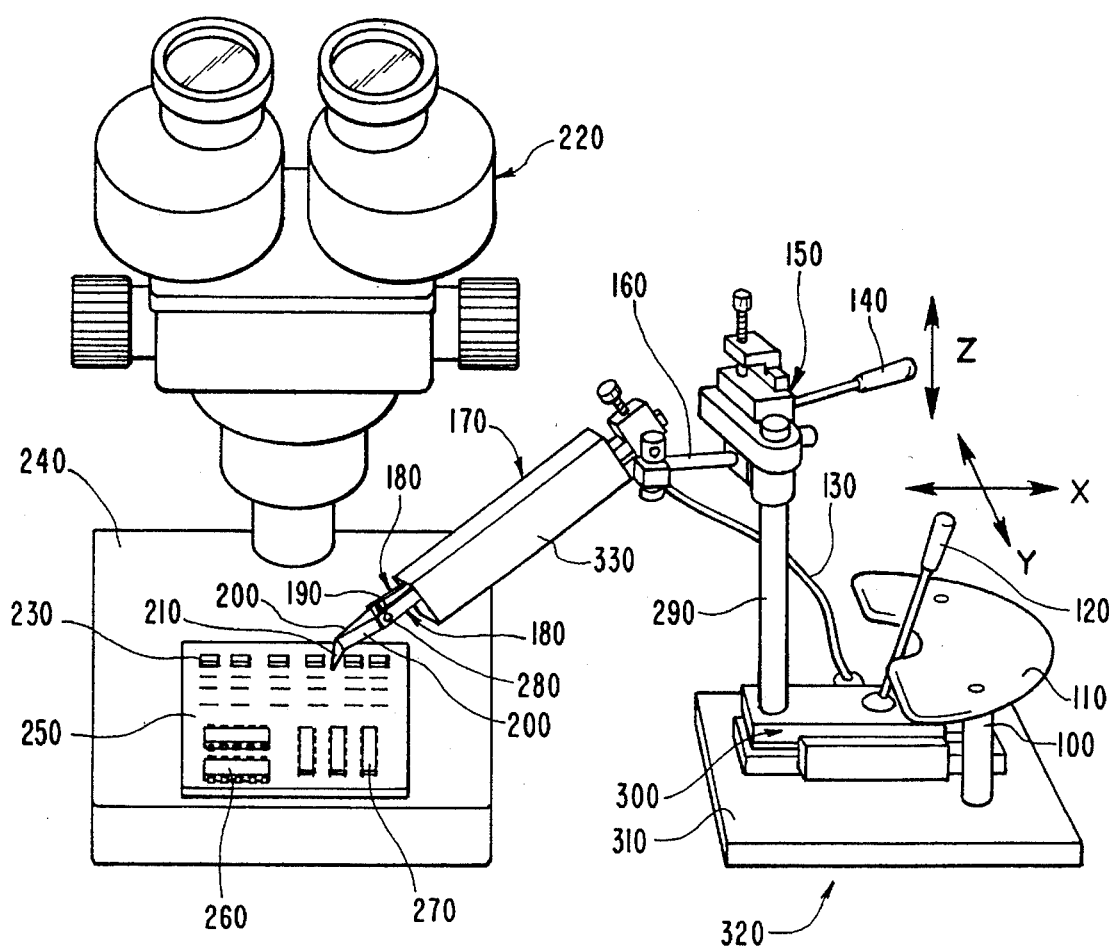
FIG. 1 is a view in perspective which illustrates a preferred embodiment of the microgripper of the invention mounted on a micromanipulator.

In FIG. 1, microgripper 170 is removably mounted on mounting arm 160 of micromanipulator 320. Microgripper 170 is electrically connected to a controller (not shown in FIG. 1) by means of electrical cord 130. Partly assembled circuit board 250 is shown located on platform 240. Microscope 220 is mounted on the back edge of platform 240 and is positioned so that it can be used by an observer who is assembling circuit board 250. Each replaceable tip 200 is attached to outer end 190 of a forceps arm 180 by means of a screw 280 and a nut (not shown) via holes or slots (not shown) in replaceable tip 200 and outer end 190. Replaceable tips 200 are similar to replaceable tips 1602 in FIGS. 16 and 17. Front portion 210 of replaceable tip 200 is tapered and downwardly angled. Replaceable tips 200 are positioned at an angle to each other so that the ends of front portions 210 can touch—similar to the arrangement in FIG. 21. To provide mating gripping surfaces, the inner surfaces of front portions 210 are slanted similar to the arrangement in FIG. 21. Replaceable tips 200 are normally in an open position—this is explained below in the discussion of microgripper 170 regarding FIGS. 2 to 7. Micromanipulator 320 is used to position ends 210 of open replaceable tips 200 on each side of a component 230, 260 or 270, and then replaceable tips 200 are closed enough so as to grip component 230, 260 or 270. Micromanipulator 320 is then used to position ends 210 of replaceable tips 200 where the observer wants to install component 230, 260 or 270 on circuit board 250. Replaceable tips 200 are opened enough so as to release component 230, 260 or 270, which can be installed before or after such release.

Figure 7:
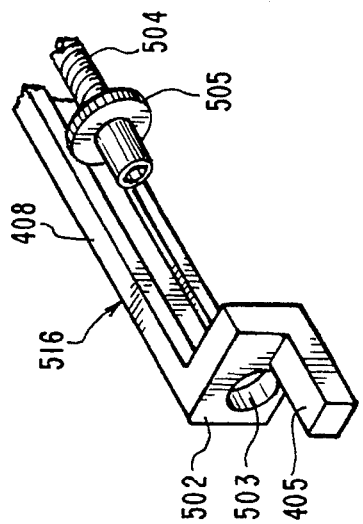
FIG. 7 is a perspective view of part of the carriage block and part of the horizontal-direction adjuster of the microgripper of FIG. 2.
Figure 6:
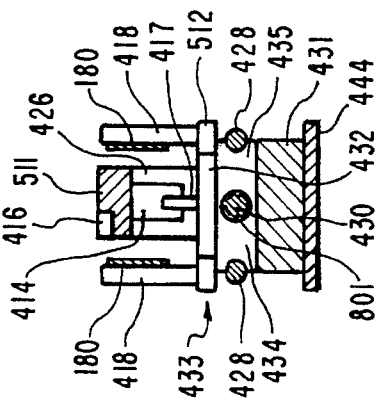
Figure 5:
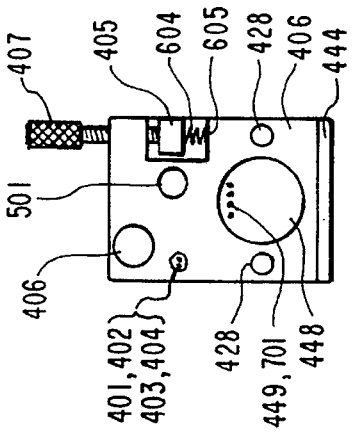
FIG. 5 is an end elevational view of the microgripper of FIG. 2 with the covers removed.

This embodiment of the invention apparatus comprises microgripper 170, micromanipulator 320 and motion/position controller system 907 (see FIGS. 7 and 8). Some specific applications for this embodiment of the invention are:

(1) It picks up small cylinders which are then inserted into a hollow fiber optic. The cylinder is used as a connector.

(2) It grips small gallium arsenide diodes for soldering to transparent quarts chucks.

(3) In reworking, it grips and removes single chips on a multichip package. It holds the new chip for soldering.

(4) In prototype and hybrid chip assembly, it holds wires and other components for soldering.

(5) It grips and places small needles to which sutures are crimped.

(6) In patch clamping, it holds small electrodes which are then inserted into single cells.

Any suitable micromanipulator can be used with the invention microgripper. Preferably, a micromanipulator which has motion capability in the X, Y and Z axes can be used. The micromanipulator serves to position the forceps arms of the microgripper.

In FIG. 1, micromanipulator 320 is a commercially-available general-purpose micromanipulator manufactured under the designation DIOP/SIO by Research Instruments, Ltd., of Kernick Road, Penryn, Cornwall, U.K. Such commercially-available micromanipulator provides movement in all three dimensions.

Micromanipulator 320 includes control lever 140, operated by slide 150 (designated SIO vertical slide), mounted column 290, which is mounted on control lever 120, and operated positioner 300 (designated DIOP positioner). Positioner 300 is mounted on base plate 310. Handrest 110 is mounted on base plate 310 via pillars 100. Positioner (control lever) 300 provides XY (10 mm) movement. Positioner 140 has an XY movement lock (not shown). Control lever 140 has a 10:1 reduction. Column 290 is mounted on the output of positioner 300. Slide 150 provides Z (10 mm) movement. Slide 150 clamps at any height on column 290. Mounting arm 160 is affixed in the bottom part of slide 150. Micromanipulator 320 has two control levers 140 and 120. Operation of lever 120 results in output movement in a horizontal plane which covers a 10 mm diameter circle. Operation of lever 140 results in vertical movement with an excursion of 10 mm. The result is fast smooth 3-dimensional movement on a reduced scale. Both levers 140 and 120 can be operated simultaneously with one hand.

Micromanipulators, manual or motorized, can be used. They are slides and stages that can position microgripper 170 on one, two or three axes. Commercially available motor driven positioning systems marketed under the trademark Unislide® by Velmex, Inc., can be used. These micromanipulators use a slide assembly (one axis positioning) driven by a stepper motor. Slider assemblies can be combined (with elevating tables and rotating tables) into multi-axis configurations. Commercially available micropositioners manufactured under the designation Micro Mini Stage Models MM-1 and MM-3 by National Aperture, Inc., of 27A Roulston Road, Windham, N.H. (one of its sales agents being Sutter Instrument Company of 2169 Francisco Boulevard, San Rafael, Calif.), can be used. Each model is a single stage for X motion, but the stages can be combined for XY and XYZ motion.

Figure 2:
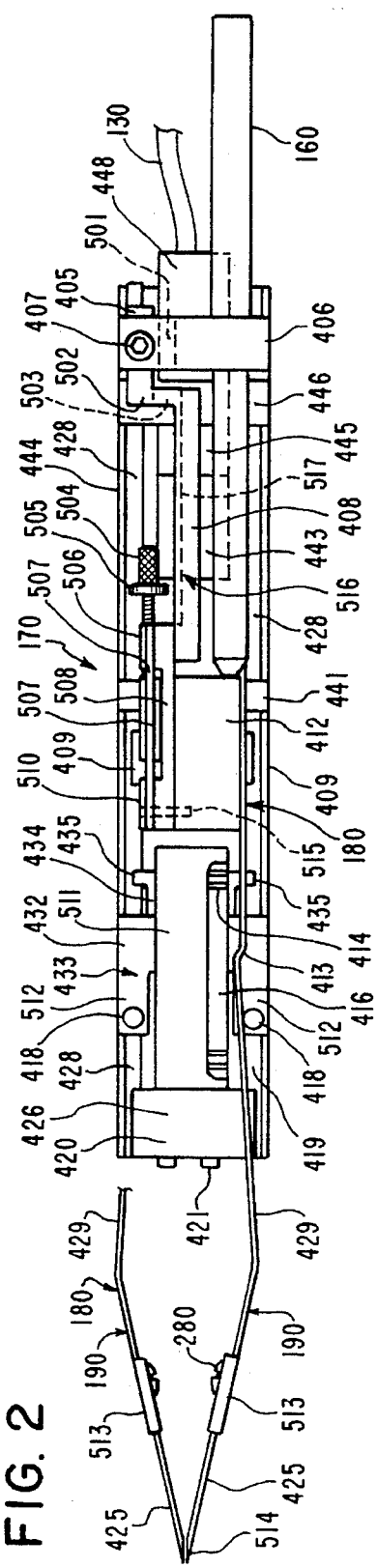
FIG. 2 is a top view of a preferred embodiment of the microgripper of the invention with the covers removed.
Figure 3:
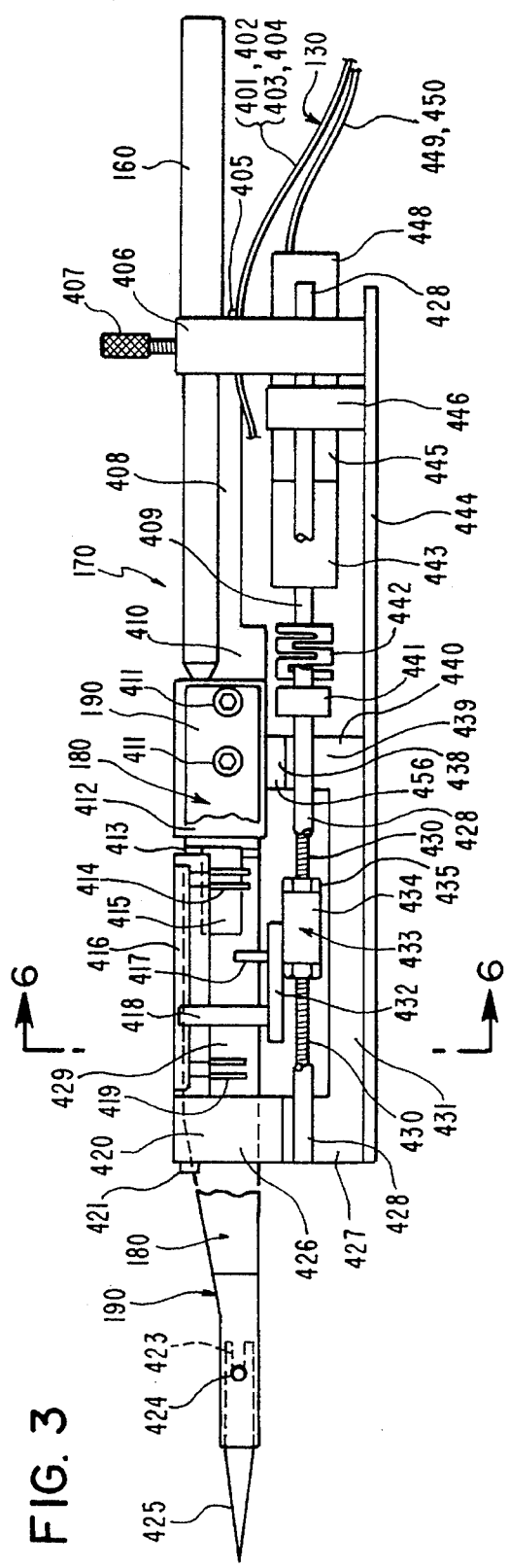
FIG. 3 is a left side elevational view of the microgripper of FIG. 2 with the covers removed.
Figure 4:
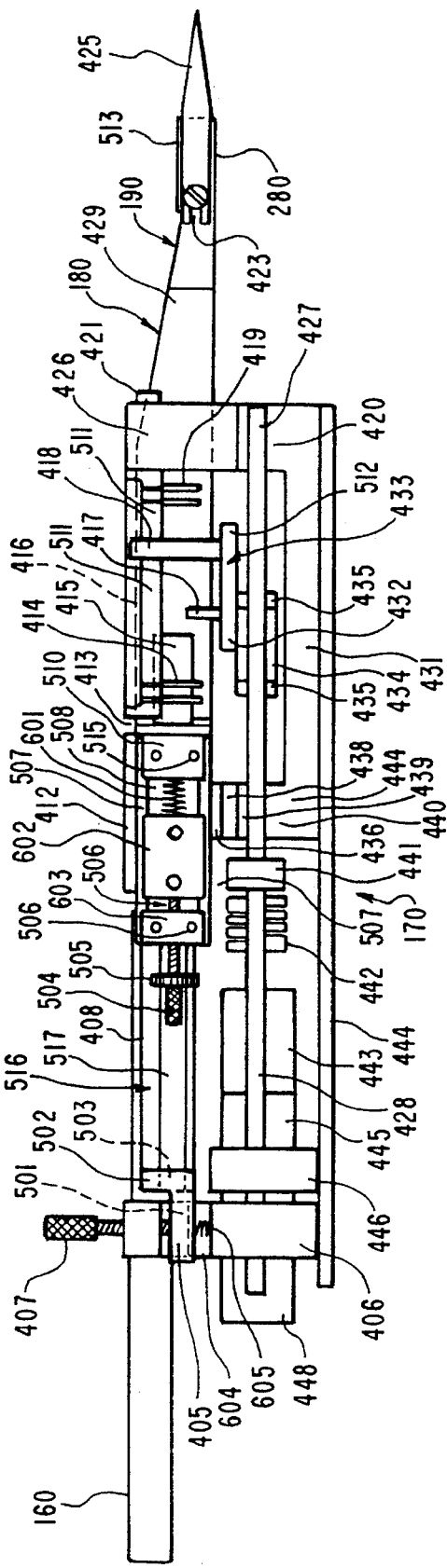
FIG. 4 is a right side elevational view of the microgripper of FIG. 2 with the covers removed.

In FIGS. 2 to 7, the top and side cover 330 of microgripper 170 shown in FIG. 1 have been removed. The invention uses the power and movement generated by a servomotor/encoder (or a stepper motor) to create a forceps or tweezer device. Stage body 431 is mounted on the front of base plate 444. Stage body 431 has front block portion 420 and back block portion 440. Front block 420 has bottom portion 427 and narrower top portion 426. Back block 440 has bottom portion 439 and narrower top portion 438. Top plate 511 is attached in a horizontal alignment to the inside of top portion 426 of front block 420 by means of screws 421. Top plate 511 contains long groove 416 on the left edge thereof. As seen in FIGS. 3 and 4, front limit switch 419 and back limit switch 414 extend downward from top plate 511 and extend therethrough to long groove 416. Rear block 406 is mounted on plate 444. Two guide bars (bearing rods) 428 are mounted in holes in rear block 406, one on each side. Just back from back block portion 440 is located spacer block 441. Two guide bars 428 extend through holes in spacer block 441 and are mounted in each side of back block portion 439 in horizontal grooves. Two guide bars 428 are also mounted in each side of front block portion 427 in horizontal grooves. Microgripper 170 can be attached to a micromanipulator (such as 320) by means of mounting arm 160, which is mounted in a hole in rear block 406. Narrow block extension 436 is located on the left top side of top portion 438 of back block 440. Top block 412 is located on top of block extension 436. The front end of mounting arm 160 is pointed and fits into a small hole in the back surface of top block 412.

Encoder 448, servomotor 445 and drive mechanism (gear head) 443 are set up as an integral unit. Shaft 409, from drive mechanism 443 which is operationally connected to lead screw 430 by means of nylon coupling 442. Lead screw 430 extends through a hole in bottom portion 439 of back block 440. The front end of lead screw 430 is rotatably mounted in a hole (which has a bushing) in bottom portion 427 of front plate 420. Servomotor 445 is mounted in a hole in motor adaptor 446. Two guide bars 447 are mounted in each side of motor adaptor 446 in horizontal grooves.

Slider assembly 433 includes slider base 434 and plate 432, the back half of which is mounted on the top of slider base 434. Two arms 512 extend forward so as to provide plate 432 with a C-shape. (Slider base 434 and plate 432 are sometimes collectively termed pin slider 418.) Two slider pins (not shown) are mounted, one on each arm 512, on the top of the front portion of plate 432. The slider pins extend to almost the top of microgripper 170. Activator pin 417, which is shorter than the slider pins is mounted in the center of the top of plate 432. Slider base 434 contains two outward-facing protrusions 435 on each side. Slider base 434 is slidably mounted on two guide bars 428 by means of horizontal grooves on the ends of protrusions 435. Lead screw 430 extends through hole 284 in slider base 434. Hole 284 is threaded. Slider assembly 433 is moved forward and backward by means of lead screw 430. The forward movement of slider assembly 433 is limited when activator pin 417 activates front limit switch 419, and the backward movement of slider assembly 433 is limited when activator pin 417 activates back limit switch 414.

The stage assembly (used in microgripper 104) represented by stage body 431, slider base 434 and two guide bars 428 is basically the same as shown in U.S. Pat. No. 4,652,095 (issued: Mar. 24, 1987; inventor: George Mauro). The pertinent portions of U.S. Pat. No. 4,652,095 are incorporated herein by reference. Attention is drawn to FIG. 1, for example, in U.S. Pat. No. 4,652,095. (The micromanipulators mentioned above of National Aperture, Inc., are also based upon the multi-stage versions disclosed in U.S. Pat. No. 4,652,095.)

The control-electronic circuit for microgripper 170 is detailed below in the description of FIGS. 8 and 9. An AC-to-DC converter is used to supply DC current to controller servomotor, etc. Alternatively, batteries can be used to supply the DC current. In either case, a constant DC current is best for operational results.

The back end of left side forceps arm 180 is stationarily mounted by means of two screws 411 to the left side of top block 412.

Support unit 516 is L-shaped, having longitudinal segment 408 and back lateral segment 502. Internal, longitudinal grooves 517 are located on the internal side surface of longitudinal segment 408. The front end of longitudinal segment 408 has lower block extension 410. Longitudinal arm 405 is located on the lower right hand back side of lateral segment 502 and extends through vertical slot 604 in the top right hand side of rear block 406. Support piece 546 is C-shaped, having longitudinal plate 508, front lateral arm 510 and back lateral arm 506. Support piece 546 is affixed to support unit 516 by means of screws 603 which extend through front lateral arm 510 into the front end of longitudinal segment 408 (and lower block extension 410). Screw 515 extends through a hole in the bottom region of front lateral arm 510 into top block 412, so as to provide a pivot point. Thumb screw 407 mounted in the top provides means for pivoting support unit 516/support piece 546 around screw 515. Thumb screw 407 extends through a vertical hole in the top of 406 into slot 604 to contact the top of longitudinal arm 405. Spring 605 is located underneath longitudinal arm 405 in slot 604. Guide rods 509 are mounted in grooves in the top and bottom of front lateral arm 510 and back lateral arm 506. Support slide 602 is slidably mounted on guide rods 509 by means of grooves in the top and bottom of support slide 602. Thumb screw 504, mounted laterally in back lateral arm 506, provides means for moving support slide 602. Thumb screw 504 extends through back lateral arm 506 to contact the back side of support slide 602. Spring 601 is located between the front side of support slide 602 and the back side of front lateral arm 510. When the cover of microgripper 170 is in place, the position of support slide 602 can be adjusted by finger turning of thumb screw 504 using rim 505 (there is a corresponding hole in the side of the cover). When the cover is on, thumb screw 504 can also be turned by inserting a tool through hole 501 in rear block 406 and hole 503 in back lateral segment 502 into the hexagon-shaped hole in the top of thumb screw 504. The back end of right side forceps arm 180 is stationarily mounted on support slide 602 by two screws into two holes 2501 in support slide 602.

Forceps arms 180 are best shown in FIGS. 21 and 25 to

27. Forceps arm 180 has two holes 2501 for mounting to top block 412 or support slide 602. At a location on both forceps arms 180 beyond the front edge of top block 412, each forceps arm 180 slants inwardly 413 for a short distance, and then continues in a straight manner 429, oriented slightly outwards. (In FIG. 2, slanted portion 413 is shown but is not at its correct location so as not to block the view of protrusion 435 of slider base 434.) Forceps arms 180 are flexible. Hole 415 in each forceps arm 180 which starts at slanted portion 413 aids the flexibility. Outer end 190 of forceps arm 180 is straight and oriented slightly inward. Forceps arm 180 is vertically narrowed towards its front by slanting the bottom of portions 429 and 190 so that the end portion of portion 190 is narrower. Replaceable tips 425 are mounted on the end of outer end 190 by means of screw 280 (and a nut) through hole 424 in outer end 190 and slot 423 in the back of replaceable tip 425. Top lip 513 of outer end 190 stabilizes replaceable tips 425. When mounted, two replaceable tips are used in diametric opposition to each other, as shown in FIG. 2. Replaceable tip 425 is tapered to a point, as seen in FIGS. 3 and 4. The inside side ends of replaceable tips 425 are inwardly slanted 514. The two separate slanted portions 514 are in parallel position so as to form matching and mating surfaces for gripping an item which usually has a square or rectangular (or the like) horizontal cross-section. To provide the precision desired for slanted portions 514, it is best to use electron discharge machining (EDM) or possibly lasers. (Any other replaceable tip described herein can be used.)

Forceps arms 180 are typically 7.5 inches long and 1 inch high. Replaceable tips 425 are typically 1 inch long. Replaceable tips 425 can be coated with non-conductive material.

Thumb screw arrangement 407 allows Z-axis (vertical) alignment of the front ends (slanted surfaces 514) of replaceable tips 425 relative to each other. Thumb screw arrangement 504 allows Y-axis (longitudinal axis) alignment of the front ends of replaceable tips 425 relative to each other.

Servomotor 445 is a conventional, commercially-available servomotor. Servomotors are usually energized through an amplifier (a device that draws power from a source other than the input signal and that produces as an output an enlarged reproduction of its input). The reference-phase voltage is constant, but the control phase has a variable voltage impressed upon it from the amplifier, which in turn receives its signal from the rest of the control system. If the rotor resistance is relatively high, the motor will exhibit variable speed characteristics. Encoder 448 allows the minute rotation of servomotor 445, hence movement of slider assembly 433.

In their normal position, the forward ends of replaceable tips 425 are spread apart. Forceps arms 180 are located inside of, but in contact with, slider pins 901—see FIGS. 2, 4, and 6. As slider assembly 433 is moved forward or backward, slider pins 901 respectively have an inward or outward biasing action (effect) on replaceable tips 425 (forceps arms 180). As a result, the forward ends of replaceable tips 425 are moved radially inward towards or outward away from each other (or an object to be picked up). The use of servomotor 445/encoder 448 allows precision, easily applied gripping of and force application to the object to be gripped. Typically replaceable tips 425 will open or close about 0.25 inch; each replaceable tip 425 can move 0.125 inch.

FIG. 8 is a circuit diagram of position/motion control system 907 for microgripper 170, which incorporates servomotor 445 and shaft encoder 448.

Figure 9:
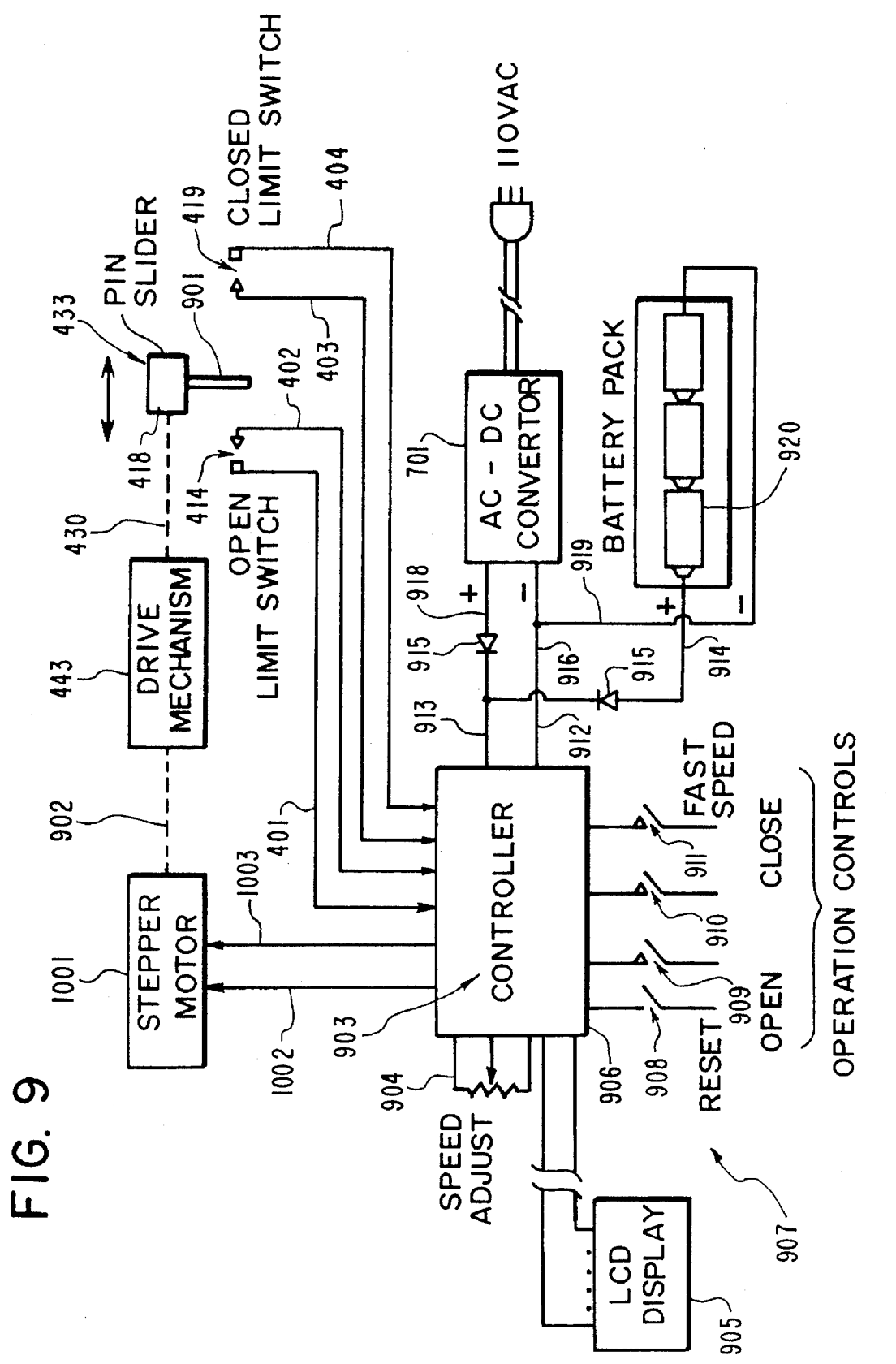

A preferred position control system 907 for microgripper 170 is shown in FIGS. 8 and 9. Slider assembly 433 is moved in two directions so as to open or close the forceps arms 180 of microgripper 170 (see FIGS. 2 to 7) by action of either servomotor 445 or stepper motor 1001 mechanically coupled (drive mechanism 443) to slider assembly 433 through a lead screw 430 which converts the motor rotational motion to the linear motion of slider assembly 433.

In the case which uses servomotor 445, shown in FIG. 8, shaft encoder 448 is mounted on, and integral with, servomotor 445 (preferably a 7 volt DC servomotor). The encoder 448 output is a pulse train with each pulse corresponding to an incremental rotation of motor shaft 902 which in turn is proportional to an incremental linear motion of slider assembly 433. That pulse train is fed (line 449) to controller 903 and used to monitor and display the relative movement of slider assembly 433. In the case which uses stepper motor 1001, encoder 448 is not required and the relative motion of slider assembly 433 is monitored in terms of the actual pulses (lines 1002 and 1003) fed to stepper motor 1001 by controller 903—see FIG. 9. In FIGS. 8 and 9, slider assembly 433 is show as pin slider 418 and slider pins 901. The arrangement is illustrated in FIGS. 2 to 7.

Two limit switches 414 and 419 are mounted on a gripper frame (not shown) and positioned to control the extreme opened and closed positions of forceps arms 180. Actuation of limit switches 414 and 419, by slider assembly 433 which reaches either a preset limit of travel, signals controller 903 to instantaneously stop drive servomotor 445 (line 450). (Electrical cord 130 includes lines 449, 450, 401, 402, 403 and 404.)

Controller 903 includes a conventional electronic servomotor or stepper motor control circuit which is contained on a single printed circuit board. Power to controller 903 is DC (direct current) which is provided either from (lines 912, 913, 918, 916) AC-to-DC converter 701 fed from any standard AC (alternating current) source or from (914, 919) a set of batteries which are contained in battery pack 920 mounted in a chassis (not shown) with controller 903. The DC outputs from AC-to-DC converter 701 and battery pack 920 are electrically isolated from each other by means of forward-based diodes 915, as shown in FIG. 8.

The operator controls include push-button switches to open 909 or close 910 forceps arm 180 of microgripper 170 at a slow speed which is adjustable by speed-adjustment potentiometer 904 which is also mounted on the controller (903) chassis and accessible to the operator. Controller 903 is manual with variable speed control. A fast speed push-button 911 is also provided which is used by the operator to override the slow speed drive for fast open or close motion. Open 909 and close 910 buttons provide the means for adjusting the displacement between replaceable tips 425 and the amount of grip force applied to the object being manipulated. The grip force after contact can be calibrated. The open and close speeds are quite slow and can be made slower or faster by turning the speed-adjustment potentiometer 904 which is located below the open 909 and close 910 buttons. To achieve very rapid open or close speeds, depress either of buttons 909 and 910, and the fast button 911 simultaneously. Once an object is in contact with both tips 425, the grip force can be increased by depressing close button 910.

Digital display 905 is mounted on the controller chassis and visible to the operator. This displays the total number of relative motion counts from either encoder 448 on servomotor 445 or the number of pulses fed to stepper motor 1001 which drives slider assembly 433. The counts on the digital display panel on the controller are encoder counts when a servomotor is used and are stepper counts when a stepper motor is used. Display 905 can be any conventional type (e.g., LED, LCD, etc.) suitable for this purpose. Display 905 can be set to read "00000" with forceps arms 180 in any position by means of a reset button 908 which is mounted on the controller chassis and is available to the operator. This allows the operator to accurately position forceps arms 180 on either side of any preset reference point.

Functions fulfilled by the controller 903 include opening and closing the replaceable tips 425, controlling the voltage supplied to the microgripper servomotor 445 which applies grip force to the specimen, controlling the speed of opening and closing the replaceable tips 425, and operating a digital display that reflects encoder counts which can be calibrated to indicate the amount of grip force being applied to the specimen. Microgripper 170 is a passive device and its performance characteristics are determined in part by controller 903.

FIGS. 2 to 8, 21, and 25 to 27 illustrate a preferred embodiment of the invention.

Stepper motor 1001 (e.g., 6V/DC) can be used in place of servomotor 445, although the use of servomotor 445 is preferred. FIG. 9 is the same as FIG. 8, except that stepper motor 1001 replaces servomotor 445 and shaft encoder 448. Six step counts on digital display 905 in FIG. 9 equal 1 micron of movement of each replaceable tip 425 or 2 microns of movement per pair of replaceable tips 425. Typically, the gripper force can be up to 2 ounces.

Any motor means, such as, a servomotor or a stepper motor, can be used to open or close forceps (means) as long as the microgripping control required by the invention can be obtained. A suitable power transmitting mechanism or any other suitable driving mechanism which is the equivalent of the servomotor (encoder) or stepper motor in results can be used.

Any suitable motion controller means can be used, for example, manual motion controllers with variable speed control or programmable PC motion controllers.

One advantageous embodiment is a programmable PC motion controller which is designed for the IBM PC family of computers. Along with a companion servo amplifier, the system provides high performance, closed loop motion control with high accuracy. The controller provides the digitally filtered analog control signals required by the servo amplifier to perform trapezoidal motion profiles with a wide range of speed and accuracies. The controller is designed around the Hewlett Packard HCTL-1100 Motion Control IC. All inputs and outputs provided by the HCTL-1100 are buffered to a 40 pin connector at the rear of the controller card which provides for a direct single ribbon I/O connection to the C-3SA. In addition, 8 bits of digital inputs and 4 bits of digital outputs are provided at a separate 20 pin connector. The controller also provides for the addition of limit and emergency stop switches, and status output signals to indicate the end of a motion sequence which can be added to the C-3SA (upon request) for monitoring system performance. Hardware interrupts may be generated by end of sequence, error, or external input signals. The controller memory maps the HCTL-1100 registers to a user selectable area within the IBM PC memory space (from address 0000:0000 to FFF0;0000). The memory-mapped communication to the controller greatly simplifies the design of user written software programs because all of the handshaking logic is handled by the hardware. Memory mapping also provides for faster software access to the actual system positions. Standard software interfaces subroutine libraries to C and Basic. Also included are sample programs plus diagnostic and exerciser programs. The controller cards are peripheral devices powered through the PC bus. When any peripheral device is added to the bus, a greater demand for power is placed on the internal power supply of the PC. The drive signals for the companion external amplifier are also derived from the computer.

Figure 10:
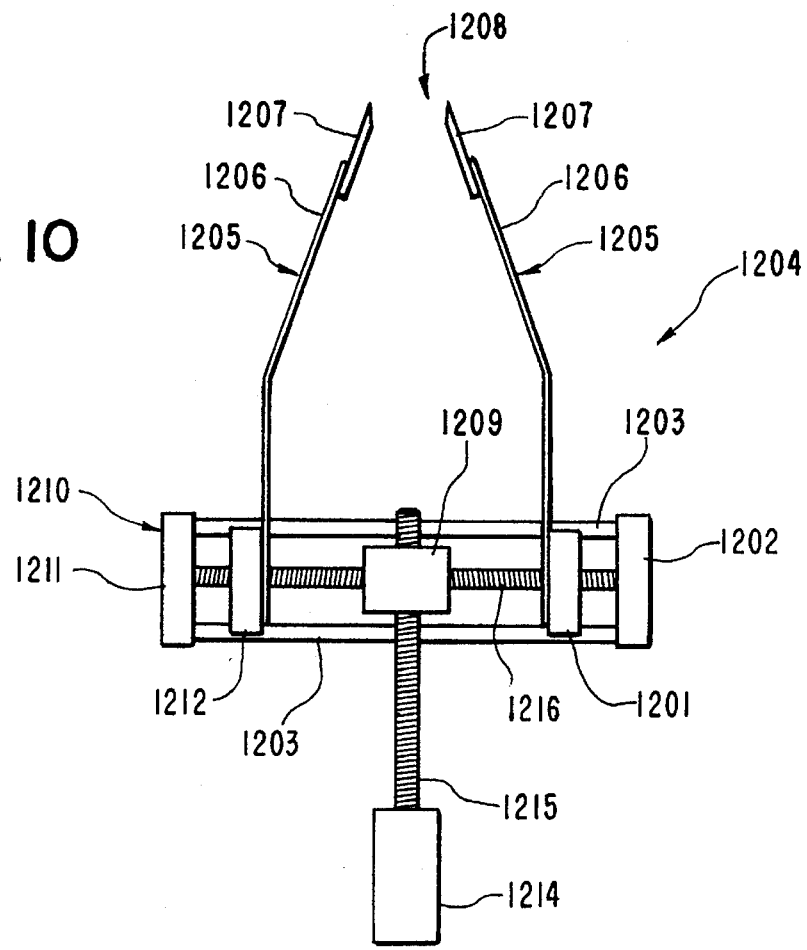
FIG. 10 is a top view of the forceps and portions of the opening-closing mechanism thereof of another embodiment of the invention.

In FIG. 10, the forward (forceps) portion of microgripper 1204 and motor 1214 is shown. Portions of microgripper 1204 not shown are similar to microgripper 170 shown in FIGS. 2 to 7, except that a slider arrangement is not used. Motor 1214 can be a stepper motor (with drive mechanism) or a servomotor-encoder (with drive mechanisms). Cradle 1210 is mounted on the base plate (not shown) perpendicular to the longitudinal axis of microgripper 1204. Cradle 1210 has end supports 1211 and 1202 mounted thereon. Bearing rods 1203 are mounted on each side of end supports 1211 and 1202 in horizontal grooves which have semicircular vertical cross-sections. Worm screw 1216, which has opposed threading on each half thereof, is rotatably mounted on each end in bushings in end supports 1211 and 1202. Worm screw 1216 extends through gear box 1209. Lead screw 1215, from motor 1214, extends through gear box 1209, and turns worm screw 1216. The central portion of worm screw 1216 is conventionally threaded so as to allow the turning of lead screw 1215 to turn it (in either direction depending on the rotational direction of the latter). Sliders 1212 and 1201, respectively, are slidably mounted on the left and right ends of bearing rods 1203 by means of horizontal grooves which have semicircular vertical cross-sections. Worm screw 1216 passes through threaded holes in sliders 1212 and 1201, thereby transmitting motion to sliders 1212 and 1201. The rear end of a forceps arm 1205 is mounted on the inner side of slider 1212 and the rear end of another forceps arm 1205 is mounted on the inner side of slider 1201. Each forceps arm 1205 has inwardly slanted end portion 1206. Replaceable tips 1207 are mounted on the ends of forceps arms 1205. The ends of replaceable tips 1207 are slanted 1208 on the inside as shown in FIG. 10 so as to form matching and mating surfaces. Gripping portions 1208 are moved to and from each other by relative movement of sliders 1212 and 1201.

Figure 11:
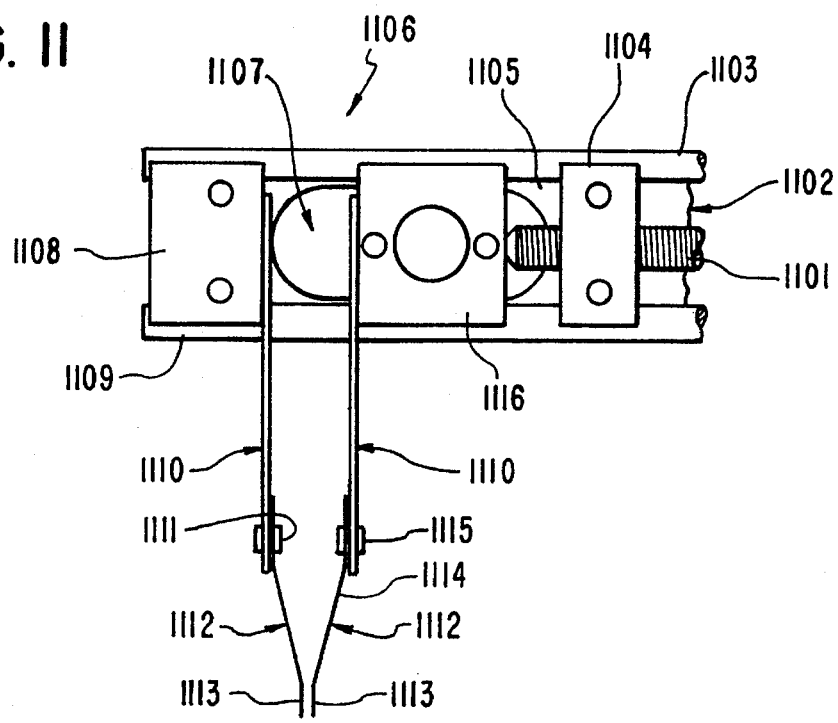
FIG. 11 is a partial top view of another embodiment of the microgripper of the invention with the covers removed.

In FIG. 11, the end or forward (forceps) portion of microgripper 1106, with the side and top covers removed, is shown. The aft portion of microgripper 1106, which is not shown, is similar to the encoder-servomotor portion of microgripper 170 shown in FIGS. 2 to 7. Base plate 1105 of main support 1102 has oblong hole 1107 therein for access to slider 1116. Stage body 1108 is mounted on the forward end of base plate 1105. Support block 1104 is mounted on base plate 1105 at the opposite end of hole 1107. Bearing mounting rods 1103 are mounted on each side of stage body 1108 and support block 1104 in horizontal grooves which have semicircular vertical cross-sections therein. Slider 1116 is slidably mounted on bearing mounting rods 1103 by means of horizontal grooves which have semicircular vertical cross-sections in the sides of slider 1116. Lead screw 1101, on its aft end, is attached via a nylon coupling (not shown) to a shaft (not shown) which protrudes from a gearhead (not shown) which in turn is coupled with the servomotor. Lead screw 1101 extends through an appropriate bushing in the center of support block 1104. The front tip of the lead screw is rotatably mounted in an appropriate bushing in the center of the aft side of slider 1116. The conventional gearhead can advance or retract the protruding shaft (screw) on command from a position control system (not shown) of the type described in conjunction with FIGS. 8 and 9. This vertical (X) movement is transferred to slider 1116 via lead screw 1101. The rear end of a forceps arm 1110 is mounted on the back side of stage body 1108 so that such forceps arm 1110 is perpendicular to the longitudinal axis of microgripper 1106. The rear end of a second forceps arm 1110 is mounted on the forward side of slider 1116 so that such forceps arm 1110 is perpendicular to the longitudinal axis of microgripper 1106. The two forceps arms 1110 face each other as illustrated. Replaceable tips 1112 are mounted on the front ends of forceps arms 1110 by means of screws (not shown) and nuts 1115. Replaceable arms 1112 have straight end sections 1111, inwardly slanted sections 1114 and straight (flat) gripping portions 1113. Gripping portions 1113 are moved to and from each other by movement of slider 1116. The forceps arm 1110, mounted on stage body 1108, is stationary in relation to the other forceps arm 1110.

In a variation of microgripper 1106 of FIG. 11, the lead screw can be extended through the slider 1116 so that it provides the X-axis motion for the slider (the gearhead then does not have to be of the type to vertically advance or retract the protruding shaft).

Figure 12:
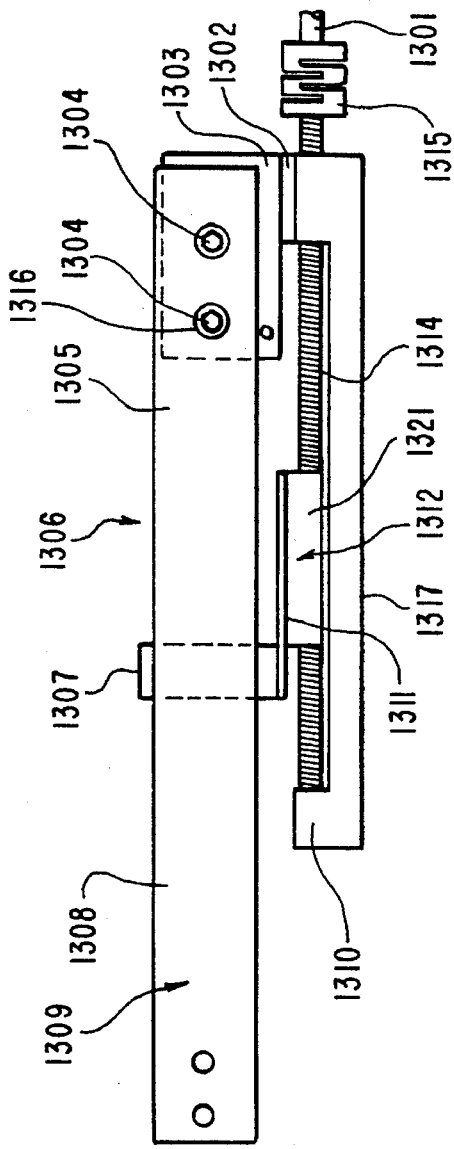
FIG. 12 is a partial top view of a further embodiment of the microgripper of the invention with the covers removed.
Figure 13:
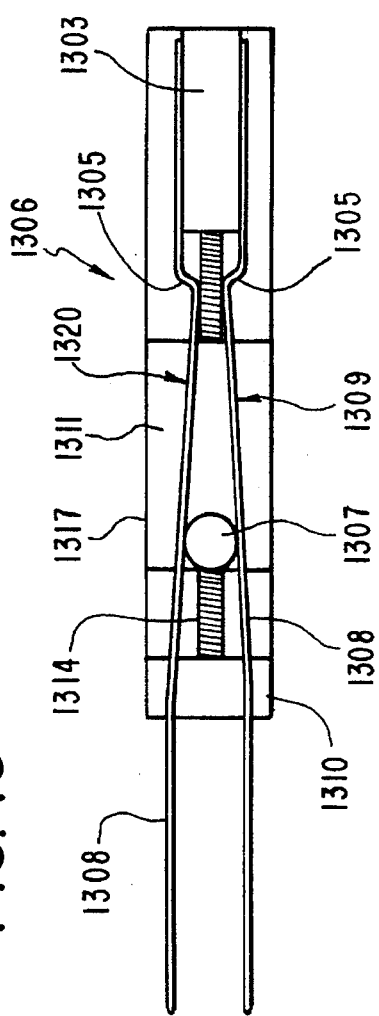
FIG. 13 is a partial side elevational view of the microgripper of FIG. 12 with the covers removed.

In FIGS. 12 and 13, the front end portion of microgripper 1306 without the top and side covers is shown. The motor portion (not shown) is similar to that of microgripper 170 in FIGS. 2 to 7. Stage body 1317 has front block portion 1310 and back block portion 1302. Lead worm screw 1314 extends through a bushing in back block 1302 and its front end is rotatably mounted in an appropriate bushing in the aft side of front block 1310. The back end of lead worm screw 1314 is coupled by means of flexible coupling 1315 to shaft 1301 of the motor (servomotor/encoder or stepper motor), which is not shown. Slider 1312 has base 1321, plate 1311 mounted on base 1321 and extends in front of mounting head 1303, and spreader (post) 1307 mounted on the front part of plate 1311. Worm screw 1314 passes through a threaded, horizontal hole in mounting head 1303, thereby transmitting motion to slider 1312. The top region (not shown) of the back block portion 1302 extends toward the front of stage body 1317. Mounting head 1303 is situated on top of the top portion of back block 1302. Forceps arm 1320 is mounted in a horizontal orientation to the right side of back block 1302 by two screws (not shown). Forceps arm 1309 is mounted in a horizontal orientation to the left side of back block 1302 by means of two screws 1304. The two holes (not shown) through which two screws 1304 fit, allow vertical horizontal adjustment of forceps arm 1309 relative to forceps arm 1320 (and back block 1302). Low-friction washers 1316 are positioned between the heads of screws 1304 and forceps arm 1309. Forceps arms 1320 and 1309 are flexible. Each of forceps arms 1320 and 1309 have inward curved portion 1305 and then slightly bowed end portions 1308. Forceps arms 1320 and 1309 are configured so that they are in contact with spreader post 1307 when slider 1312 is positioned all of the way forward. Replaceable tips (not shown) of the type taught herein are mounted on the front ends of forceps arms 1320 and 1309—in the normal situation the replaceable tips touch each other (in pressure contact). When spreader post 1307 is moved backwards, forceps arms 1320 and 1309 (and the replaceable tips) are forced apart, thereby allowing positioning around an item— movement of spreader post 1307 provides gripping action.

Another version of the replaceable tip 425 of forceps arm 180 is shown in FIGS. 14 and 15. Two replaceable tips 1404 are used in diametric opposition to each other, in the manner as shown in FIG. 2. Tapered end 1403 of tip 1404 has a gripping surface on each side of the end portion thereof. In one gripping alternative, left side 1402 of the end portion of tapered end 1403 is inwardly slanted 1401. Slanted portion 1401 forms a gripping surface and typically has a horizontal length of 17 to 36 mils. The two separate slanted portions 1401 are in parallel position so as to form matching and mating surfaces for gripping an item which has a square or rectangular (or the like) horizontal cross-section. In another gripping alternative, right side 1501 of the end portion of tapered end 1403 is also inwardly slanted 1502 with wide V-shaped groove 1503 therein. The two separate slanted portions 1502 are in parallel position so as to form matching and mating surfaces for gripping an item having a circular (e.g., a cylinder or spherical), oblong or similar curved horizontal cross-section. Typically grooves 1503 have dimensions such that they can be used to grip cylinders which have horizontal (lateral) diameters of 1 to 30 mils. Slot 1405 in the base portion of replaceable tip 1404 allows attachment to outer end 190 of forceps arm 180 in the manner shown in FIGS. 2, 3 and 25, for example, by means of screw 280 (and a corresponding nut) through hole 424 in outer end 190.

Preferably, all of the forceps arms and the replaceable tips of the forceps arms are stainless steel.

Another version of the replaceable tip 425 of forceps arm 180 is shown in FIGS. 16 and 17. Two replaceable tips 1602 are used in diametric opposition to each other, in the manner shown in FIG. 2. Tapered end 1605 of tip 1602 is set at an angle to the base portion of tip 1602 (typically about 45 degrees). The taper feature often provides the advantage of being able to manipulate/grip items in crowded or relatively inaccessible locations. Tapered end 1605 of tip 1602 has a gripping surface 1604 on one side of the end portion thereof. Right side 1603 of the end portion of tapered end 1602 is inwardly slanted 1604. Slanted portion 1604 forms a gripping surface and typically has a horizontal length of 25 to 1000 mils. The two separate slanted portions 1604 are in a parallel position so as to form matching and mating surfaces for gripping an item which has a square or rectangular horizontal cross-section. Slot 1601 in the base portion of replaceable tip 1602 allows attachment to outer end 190 of forceps arm 180 in the manner shown in FIG. 2, 3 and 25, for example, by means of screw 280 (and a corresponding nut) through hole 424 in outer end 190.

Another version of the outer end portion 1704 of the replaceable tips 1701 of forceps arms 1110 is shown in FIGS. 18 and 19. Two replaceable tips 1701 are used in diametric opposition to each other, in the manner as shown in FIG. 11. Replaceable tips 1701 have the same general angled shape of replaceable tips 1112 in FIG. 11. Outer end portion 1704 has two working or gripping surfaces. One side of end portion 1704 is flat 1702. In FIG. 17, two end portions 1704 are shown in a parallel arrangement so that flat side 1702 of each end portion 1704 faces each other in a parallel manner so as to form matching and mating surfaces for gripping. In this manner, flat sides 1702 can grip an item 1705 which has a square or rectangular horizontal cross-section. The other side of end portion is a wide V-shaped groove 1703 in a flat surface. In FIG. 19, two end portions 1704 are shown arranged parallel so that the flat side which has groove 1703 of each end portion 1704 faces each other in a parallel manner so as to form matching and mating grooves for gripping. In this manner, grooves 1703 can grip an item 1801 which has a circular (a cylinder or spheroid), oblong or similar curved horizontal cross-section. The base (not shown) of replaceable tip 1701 has a slot or hole (not shown) for attachments to forceps arm 180 by means of a screw (bolt) and nut, as in FIG. 11.

FIG. 20 shows tip extensions 1905 to which replaceable tips 1901 can be affixed by screws 1907 (and nuts 1906) through a hole (not shown) in the end 1902 of tip extension 1905 and a slot or hole (neither shown) in the base of replaceable tip 1901. Tip extenders 1905, as shown, are used with forceps arms 180 in FIG. 2. Tip extenders 1905 allow the outer ends (not shown) of replaceable tips 1901 to be located further apart so as to grip items which are larger than normally can be gripped in the arrangement shown in FIG. 2. The tip extender has inwardly slanted base portion 1904, outward extending middle portion 1903 and end portion 1902 (which is parallel to the longitudinal axis of microgripper 170 of FIG. 2). Versions of the tip extenders can be used with the forceps arms 1110 in FIG. 11.

Another version of the replaceable tip 425 of forceps arm 180 is shown in FIGS. 22 and 23. Two replaceable tips 2006 are used in diametric opposition to each other, in the manner as shown in FIG. 2. Tapered end 2005 of tip 2006 has a gripping surface on each side of the end portion thereof. In one gripping alternative, left side 2104 of the end portion of tapered end 2005 is inwardly slanted 2003. Slanted portion 2003 forms a gripping surface. The two separate slanted portions 2003 are in parallel position so as to form matching and mating surfaces for gripping an item which has a square or rectangular (or the like) horizontal cross-section. In another gripping alternative, right side 2101 of the end portion of tapered end 2005 is also inwardly slanted 2102 with wide V-shaped groove 2103 therein. The two separate slanted portions 2102 are in a parallel position so as to form matching and mating surfaces for gripping an item which has a circular (e.g., a cylinder or spherical), oblong or similar curved horizontal cross-section. As seen in FIG. 22, tapered end 2005 has slanted portion 2001, slanted portion 2002 and rectangular portion 2004. The base (not shown) of replaceable tip 2006 has a slot or hole (not shown) for attachment to forceps arm 180 by means of a screw (bolt) and nut, as in FIG. 2.

Having described specific embodiments of the present invention, it is obvious to those skilled in the art that the present invention is not limited to the above-mentioned embodiments and that various changes and modifications may be made in the invention without departing from the spirit and the scope thereof.

Another version of the replaceable tip 425 of forceps arm 180 is shown in FIG. 24. Two replaceable tips 2205 are used in diametric opposition to each other, in the manner as shown in FIG. 2. Tapered end 2203 of tip 2205 has a gripping surface on each side of the end portion thereof. In one gripping alternative, left side 2204 of the end portion of tapered end 2203 is inwardly slanted 2201. Slanted portion 2201 forms a gripping surface. The two separate slanted portions 2204 are in a parallel position so as to form matching and mating surfaces for gripping an item which has a square or rectangular (or the like) horizontal cross-section. In another gripping alternative, right side 2202 of the end portion of tapered end 2203 is also inwardly slanted with wide V-shaped groove 2206 therein. The two separate slanted portions 2202 are in a parallel position so as to form matching and mating surfaces for gripping an item which has a circular (e.g., a cylinder or spherical), oblong or similar curved horizontal cross-section. The base (not shown) of replaceable tip 2205 has a slot or hole (not shown) for attachment to forceps arm 180 by means of a screw (bolt) or nut, as shown in FIG. 2.

The replaceable tips can be electrically isolated from the forceps arms, etc.

The invention includes using a manual control system (i.e., buttons, etc., manually activated as shown for controller 903) for positioning or a closed-loop servo position control system for an accurate positioning of the replaceable tips of the microgripper. The latter may be used when working in a programmed mode.

What is claimed is:

1. A microgripper for gripping and releasing an object, comprising:
   (a) support means having a first and a second end;
   (b) motor means affixed to said support means, the motor means being selected from the group consisting of a stepper motor and a servomotor with an encoder which is integral with the servomotor, the servomotor having a rotatable shaft, said encoder being adapted to control the rotational speed of the servomotor and the shaft thereof, which in turn controls the relative motion of a slide means;
   (c) slide means driven by said motor means, said slide means having a first end and a second end, said first end of said slide means facing said first end of said support means; and
   (d) a first cantilevered flexible arm and a second cantilevered flexible arm, an end of said first arm being mounted on the first end of said support means, another end of said first arm being free, an end of said second arm being mounted on the first end on said slide means, another end of said second arm being free, the free ends of said arms being positioned so that the free end of the second arm mounted on said slide means is capable of being moved toward and away from the free end of the first arm mounted on the support means, the free ends of said arms being capable of being flexed towards and away from each other in a common plane, each of said free ends of said arms being a fine tip, the slide means being adapted to move the free end of the second arm mounted on said slide means toward or away from the free end of the first arm mounted on the support means, thereby providing, respectively, a gripping or releasing movement, said gripping taking place with the tip ends of said free ends of said arms, the tip ends of said free ends of said arms being capable of gripping a very small fragile object.

2. The microgripper of claim 1 wherein the tip of the free end of the first cantilevered arm comprises a first replaceable tip, and the tip of the free end of the second cantilevered arm comprises a second replaceable tip.

3. The microgripper of claim 2 wherein the tip of the free end of the first cantilevered arm and the tip of the free end of the second cantilevered arm each has a slanted tip, and the slanted tips face each other.

4. The microgripper of claim 2 wherein the tip of the free end of the first cantilevered arm and the tip of the free end of the second cantilevered arm each has a vertical slide groove, and the vertical slide grooves face each other.

5. The microgripper of claim 1 wherein the motor means is the stepper motor.

6. The microgripper of claim 1 wherein the motor means is the servomotor and the encoder.

7. An apparatus comprising:
   (i) a micromanipulator; and
   (ii) a microgripper for gripping and releasing an object, comprising:
   (a) support means having a first and a second end;
   (b) motor means affixed to said support means, the motor means being selected from the group consisting of a stepper motor and a servomotor with an encoder which is integral with the servomotor, the servomotor having a rotatable shaft, said encoder being adapted to control the rotational speed of the servomotor and the shaft thereof, which in turn controls the relative motion of a slide means;

(c) slide means driven by said motor means, said slide means having a first end and a second end, said first end of said slide means facing said first end of said support means; and (d) a first cantilevered flexible arm and a second cantilevered flexible arm, an end of said first arm being mounted on the first end of said support means, another end of said first arm being free, an end of said second arm being mounted on the first end of said slide means, another end of said second arm being free, the free ends of said arms being positioned so that the free end of the second arm mounted on said slide means is capable of being moved toward and away from the free end of the first arm mounted on the support means, the free ends of said arms being capable of being flexed towards and away from each other in a common plane, each of said free ends of said arms being a fine tip, the slide means being adapted to move the free end of the second arm mounted on said slide means toward or away from the free end of the first arm mounted on the support means, thereby providing, respectively, a gripping or releasing movement, said gripping taking place with the tip ends of said free ends of said arms, the tip ends of said free ends of said arms being capable of gripping a very small fragile object.

8. The apparatus of claim 7 wherein the tip of the free end of the first cantilevered arm comprises a first replaceable tip, and the tip of the free end of the second cantilevered arm comprises a second replaceable tip.

9. The apparatus of claim 8 wherein the tip of the free end of the first cantilevered arm and the tip of the free end of the second cantilevered arm each has a slanted tip, and the slanted tips face each other.

10. The apparatus of claim 8 wherein the tip end of the free end of the first cantilevered arm and the tip of the free end of the second cantilevered arm each has a vertical slide groove, and the vertical slide grooves face each other.

11. The apparatus of claim 7 wherein the motor means is the stepper motor.

12. The apparatus of claim 7 wherein the motor means is the servomotor and the encoder.

* * * * *